US008291695B2

(12) United States Patent  
Perry et al.

(10) Patent No.: US 8,291,695 B2
(45) Date of Patent: Oct. 23, 2012

(54) METHOD AND APPARATUS FOR CONTROLLING EXHAUST EMISSIONS IN A SPARK-IGNITION DIRECT-INJECTION ENGINE

(75) Inventors: Kevin L. Perry, Fraser, MI (US); Thompson M. Sloane, Oxford, MI (US); Jong H. Lee, Rochester Hills, MI (US); Kushal Narayanaswamy, Sterling Heights, MI (US); Wei Li, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 476 days.

(21) Appl. No.: 12/329,162

(22) Filed: Dec. 5, 2008

(65) Prior Publication Data

US 2010/0139251 A1    Jun. 10, 2010

(51) Int. Cl.
*F01N 3/00* (2006.01)
(52) U.S. Cl. ............................................. 60/286; 60/299
(58) Field of Classification Search ...................... 60/286
See application file for complete search history.

(56) References Cited

U.S. PATENT DOCUMENTS

| | | | | |
|---|---|---|---|---|
| 5,657,625 A * | 8/1997 | Koga et al. | ...................... | 60/274 |
| 5,782,087 A * | 7/1998 | Kinugasa et al. | ............... | 60/276 |
| 5,783,160 A * | 7/1998 | Kinugasa et al. | ............. | 423/237 |
| 6,047,542 A * | 4/2000 | Kinugasa et al. | ............... | 60/274 |
| 6,119,452 A * | 9/2000 | Kinugasa et al. | ............... | 60/285 |
| 6,253,728 B1 | 7/2001 | Matayoshi et al. | | |
| 7,063,642 B1 * | 6/2006 | Hu et al. | ...................... | 477/100 |
| 7,065,958 B2 * | 6/2006 | Funk et al. | ...................... | 60/286 |
| 7,210,288 B2 * | 5/2007 | Bandl-Konrad et al. | ........ | 60/297 |
| 2002/0157379 A1 * | 10/2002 | Kakuyama et al. | ............. | 60/276 |
| 2004/0088970 A1 * | 5/2004 | Mulligan | ......................... | 60/286 |
| 2004/0098971 A1 * | 5/2004 | Upadhyay et al. | ............... | 60/286 |
| 2004/0154285 A1 * | 8/2004 | Nagaoka et al. | ................. | 60/285 |
| 2005/0022450 A1 * | 2/2005 | Tan et al. | ..................... | 48/198.3 |
| 2005/0129601 A1 | 6/2005 | Li et al. | | |
| 2007/0028601 A1 * | 2/2007 | Duvinage et al. | ............... | 60/286 |
| 2007/0062180 A1 * | 3/2007 | Weber et al. | .................... | 60/286 |
| 2007/0079602 A1 * | 4/2007 | Hu et al. | .......................... | 60/286 |
| 2007/0125071 A1 * | 6/2007 | Westerberg | ...................... | 60/286 |
| 2007/0144156 A1 * | 6/2007 | Gandhi et al. | ................... | 60/297 |
| 2007/0204600 A1 * | 9/2007 | Kubinski et al. | ................ | 60/286 |
| 2007/0248517 A1 * | 10/2007 | Nagata et al. | .............. | 423/213.5 |
| 2008/0016850 A1 * | 1/2008 | Shamis et al. | ................... | 60/286 |
| 2008/0089820 A1 | 4/2008 | Jacob | | |
| 2008/0102010 A1 | 5/2008 | Bruck et al. | | |
| 2008/0209894 A1 | 9/2008 | Persson | | |
| 2008/0271438 A1 | 11/2008 | Hinz et al. | | |
| 2008/0271442 A1 | 11/2008 | Baumgartner | | |

OTHER PUBLICATIONS

U.S. Appl. No. 12/360,908, Najt, et al.
Nakahira, T.,"Catalytic Engine" NOx Reduction of Diesel Engines with New Concept Onboard Ammonia Synthesis System; SAE Technical Paper Series; Feb. 1992; SAE 920469.
Ogunwumi, S.; In-Situ NH3 Generation for SCR NOx Applications; SAE Technical Paper Series; Oct. 2002; SAE 2002-01-2872.

* cited by examiner

*Primary Examiner* — Thomas Denion
*Assistant Examiner* — Jason Shanske

(57) ABSTRACT

Exhaust emissions from a spark-ignition direct-injection engine connected to an oxidation catalytic device and a selective catalyst reduction device having a capacity to store ammonia reductant are controlled. The engine operates in a first combustion mode to generate ammonia reductant, stored on the second aftertreatment device. The engine operates lean of stoichiometry and nitrides of oxygen in the exhaust gas feedstream are reduced on the second aftertreatment device.

9 Claims, 3 Drawing Sheets

METHOD AND APPARATUS FOR CONTROLLING EXHAUST EMISSIONS IN A SPARK-IGNITION DIRECT-INJECTION ENGINE

TECHNICAL FIELD

This disclosure relates to operation and control of internal combustion engines and exhaust aftertreatment systems, and more specifically to engines operating lean of stoichiometry and associated exhaust aftertreatment systems.

BACKGROUND

The statements in this section merely provide background information related to the present disclosure and may not constitute prior art.

An engine configured for spark ignition combustion can be adapted to operate in a stratified charge combustion mode under predetermined speed/load operating conditions. It is known that operating lean of stoichiometry using a stratified combustion charge can improve fuel economy but can increase exhaust emissions, including nitrogen oxides (hereafter NOx). It is known to use an ammonia-selective catalytic reduction device to reduce NOx in the presence of a reductant, e.g., urea. It is known that refilling a urea tank can burden an operator.

Known aftertreatment systems for internal combustion engines operating lean of stoichiometry can include a three-way catalytic converter followed by other exhaust aftertreatment devices, including a lean-NOx reduction catalyst, also referred to as a lean NOx adsorber (hereafter LNT device) and a selective catalytic reduction (SCR) catalytic device. Known three-way catalytic converters (hereafter TWC) function to reduce engine-out hydrocarbon (HC), carbon monoxide (CO), and nitrides of oxygen (NOx) emissions during stoichiometric engine operation and HC and CO emissions during lean operation.

Known SCR devices include catalyst material(s) that promotes the reaction of NOx with a reductant, such as ammonia (NH3) or urea, to produce nitrogen and water. The reductants may be injected into an exhaust gas feedstream upstream of the SCR device, requiring injection systems, tanks and control schemes. The tanks may require periodic refilling and can freeze in cold climates requiring additional heaters and insulation.

Known catalyst materials used in SCR devices have included vanadium (V) and tungsten (W) on titanium (Ti). Mobile applications include base metals including iron (Fe) or copper (Cu) with a zeolite washcoat as catalyst materials. Material concerns for catalyst materials include temperature operating ranges, thermal durability, and reductant storage efficiency. For mobile applications, SCR devices generally have a preferable operating temperature range of 200° C. to 600° C., and may vary depending on the selected catalyst material(s). The operating temperature range can decrease during or after higher load operations. Temperatures greater than 600° C. may cause reductants to breakthrough and degrade the SCR catalysts, and effectiveness of NOx reduction can decrease at temperatures lower than 200° C.

SUMMARY

A method for controlling exhaust emissions from an engine configured for spark ignition direct fuel injection operation includes connecting an aftertreatment system to an exhaust outlet of the engine to entrain an exhaust gas feedstream. The aftertreatment system includes a first aftertreatment device fluidly connected upstream of a second aftertreatment device. The first aftertreatment device includes an oxidation catalytic device and the second aftertreatment device includes a selective catalyst reduction device having a capacity to store ammonia reductant. A nozzle of a reductant injection device is inserted into the aftertreatment system upstream of the second aftertreatment device. The engine is operated in a first combustion mode to generate ammonia reductant in the exhaust gas feedstream upstream of the second aftertreatment device. The ammonia reductant is stored on the second aftertreatment device. The engine operates lean of stoichiometry and nitrides of oxygen in the exhaust gas feedstream are reduced using the ammonia reductant stored on the second aftertreatment device.

BRIEF DESCRIPTION OF THE DRAWINGS

One or more embodiments will now be described, by way of example, with reference to the accompanying drawings, in which.

DETAILED DESCRIPTION

Figure 1:
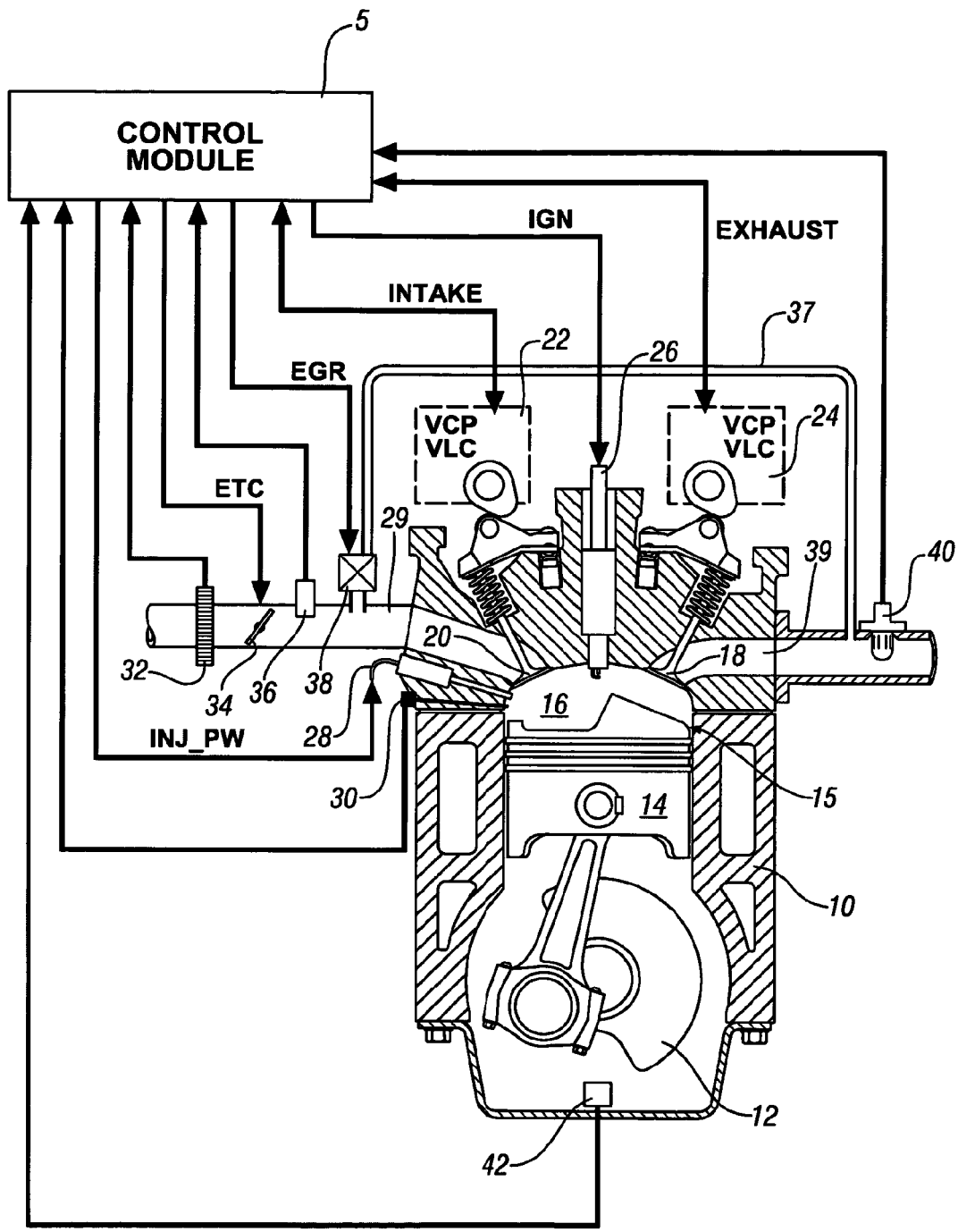
FIG. 1 is a schematic drawing of an engine system, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control system executed in a control module 5 that have been constructed in accordance with an embodiment of the disclosure. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system comprises air flow ductwork and devices for monitoring and controlling the air flow. The devices preferably include a mass air flow sensor 32 for monitoring mass air flow and intake air temperature. A throttle valve 34, preferably comprising an electronically controlled device, controls air flow to the engine 10 in response to a control signal (ETC) from the control module 5. A manifold pressure sensor 36 monitors manifold absolute pressure and barometric pressure in the intake manifold 29. An external flow passage 37 having a flow control valve 38 (exhaust gas recirculation or EGR valve) can recirculate residual exhaust gases from an exhaust manifold 39 to the intake manifold 29. The control module 5 preferably controls mass flow of recirculated exhaust gas to the intake manifold 29 by controlling magnitude of opening of the EGR valve 38.

Air flow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39.

Openings and closings of the intake and exhaust valves 20 and 18 are preferably controlled with a dual camshaft (as depicted), the rotations of which are linked and indexed with rotation of the crankshaft 12. A VCP/VLC device 22 preferably comprises a controllable mechanism operative to variably control valve lift (VLC) and variably control cam phasing (VCP) of the intake valve(s) 20 for each cylinder 15 in response to a control signal (INTAKE) from the control module 5. A VCP/VLC device 24 preferably comprises a controllable mechanism operative to variably control valve lift (VLC) and variably control phasing (VCP) of the exhaust valve(s) 18 for each cylinder 15 in response to a control signal (EXHAUST) from the control module 5. The VCP/VLC devices 22 and 24 each preferably include a controllable two-step valve lift mechanism operative to control magnitude of valve lift, or opening, of the intake and exhaust valve(s) 20 and 18 to one of two discrete steps. The two discrete steps preferably include a low-lift valve open position (about 4-6 mm) for load speed, low load operation, and a high-lift valve open position (about 8-10 mm) for high speed and high load operation. The VCP/VLC devices 22 and 24 preferably include variable cam phasing mechanisms to control phasing (i.e., relative timing) of opening and closing of the intake valve(s) 20 and the exhaust valve(s) 18 respectively. The phasing refers to shifting opening times of the intake and exhaust valve(s) 20 and 18 relative to positions of the crankshaft 12 and the piston 14 in the respective cylinder 15. The variable cam phasing systems of the VCP/VLC devices 22 and 24 preferably have a range of phasing authority of about 60°-90° of crank rotation, thus permitting the control module 5 to advance or retard opening and closing of one of the intake and exhaust valve(s) 20 and 18 relative to the position of the pistons 14 for each cylinder 15. The range of phasing authority is defined and limited by the VCP/VLC devices 22 and 24. The VCP/VLC devices 22 and 24 include camshaft position sensors (not shown) to determine rotational positions of the intake and the exhaust camshafts (not shown). The VCP/VLC devices 22 and 24 are actuated using one of electro-hydraulic, hydraulic, and electric control force, controlled by the control module 5.

The engine 10 includes a fuel injection system comprising a plurality of high-pressure fuel injectors 28 each adapted to directly inject a mass of fuel into the combustion chamber 16 in response to a control signal (INJ_PW) from the control module 5. As used herein, fueling refers to a injecting fuel flow into one of the combustion chambers 16. The fuel injectors 28 are supplied pressurized fuel from a fuel distribution system (not shown). The engine 10 includes a spark ignition system by which spark energy is provided to a spark plug 26 for igniting or assisting in igniting cylinder charges in each combustion chamber 16 in response to a control signal (IGN) from the control module 5. The control signal controls spark timing relative to position of the piston 14 in the combustion chamber 16 and spark dwell time.

The engine 10 is equipped with various sensing devices for monitoring engine operation, including a crank sensor 42 operative to monitor crankshaft rotational position, i.e., crank angle and speed, a wide range air/fuel ratio sensor 40 adapted to monitor air/fuel ratio in the exhaust gas feedstream. In one embodiment, a combustion sensor 30 can monitor in-cylinder combustion in real-time during ongoing operation of the engine 10.

The exemplary engine uses a stratified fuel charge design including operating at high compression ratio with each fuel injector 28 aimed to inject fuel into a subchamber area of the combustion chamber 16 formed at the top of the piston 14, providing a rich charge proximal to the spark plug 26 that ignites easily and burns quickly and smoothly. During each combustion cycle, a flame front moves from a rich region to a lean region, improving combustion and reducing NOx formation.

The control system is executed as a set of control algorithms in the control module 5 to control operation of the engine 10. The control module 5 preferably comprises a general-purpose digital computer including a microprocessor or central processing unit, storage mediums comprising non-volatile memory including read only memory and electrically programmable read only memory, random access memory, a high speed clock, analog to digital conversion circuitry and digital to analog circuitry, and input/output circuitry and devices, and appropriate signal conditioning and buffer circuitry. The control module 5 executes the control algorithms to control operation of the engine 10. The control algorithms comprise resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event. The engine 10 is controlled to operate at a preferred air-fuel ratio to achieve performance parameters related to operator requests, fuel consumption, emissions, and driveability, with the intake air flow controlled to achieve the preferred air-fuel ratio.

Figure 2:
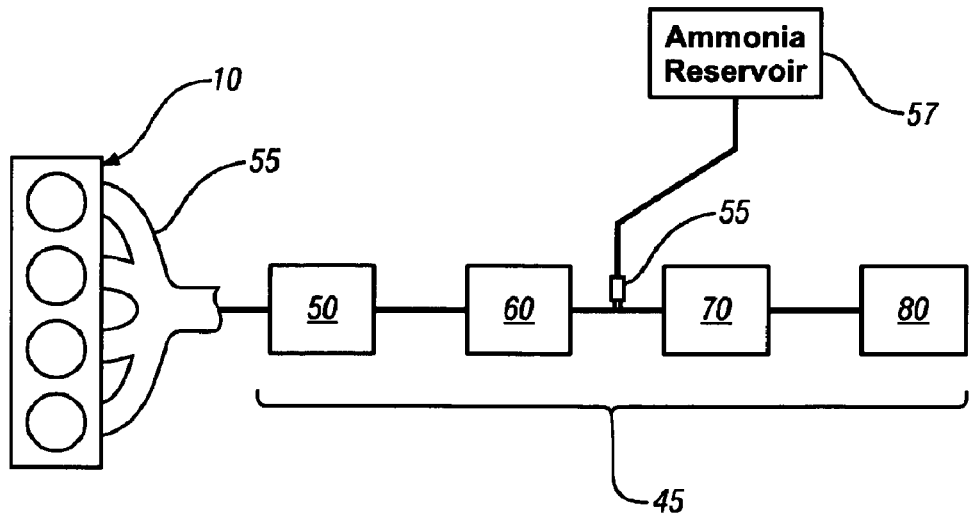
FIG. 2 is a schematic block diagram of an exhaust aftertreatment system, in accordance with the present disclosure.

FIG. 2 schematically shows an exhaust aftertreatment system 45 that is fluidly couplable to the exhaust manifold 39 of the engine 10 to manage and treat the exhaust gas feedstream. The exhaust aftertreatment system 45 comprises a plurality of aftertreatment devices fluidly connected in series. There can be first, second, third and fourth aftertreatment devices 50, 60, 70 and 80, as shown in the embodiment of FIG. 2. The first, second, third and fourth aftertreatment devices 50, 60, 70 and 80 can be assembled into individual structures that are fluidly connected and assembled in a vehicle underbody with one or more sensing devices (not shown) placed therebetween. Alternatively, the first and second aftertreatment devices 50 and 60 can be assembled into a first structure and the third and fourth aftertreatment devices 70 and 80 can be placed into a second structure. One having skill in the art can conceive of other assembly configurations.

The first aftertreatment device 50 can comprise a HC reforming catalytic device, preferably comprising a cordierite substrate having an alumina-based washcoat containing one or more platinum-group metals, e.g., Pt, Pd, and Rh. In an embodiment wherein reformates are generated in the engine 10 using combustion techniques, the first aftertreatment device 50 may be omitted.

The second aftertreatment device 60 comprises a three-way/oxidation catalytic device, preferably comprising a cordierite substrate having an alumina-based washcoat containing one or more platinum-group metals, e.g., Pt, Pd, Rh and cerium for oxygen storage and release functionality.

The third aftertreatment device 70 comprises an ammonia-SCR catalytic device, preferably comprising a cordierite substrate having a zeolite-based washcoat containing one or more metals, e.g., Fe, Cu, Vanadium (V), Tungsten (W) and Titanium (Ti)

The fourth aftertreatment device 80 preferably comprises an ammonia slip catalytic device, comprising a cordierite substrate having an alumina-based washcoat containing one or more platinum-group metals, e.g., Pt, Pd, Rh, operative to oxidize NH3 and other exhaust gas feedstream constituents.

Design features for each of the catalytic devices, e.g., volume, space velocity, cell densities, washcoat densities, and metal loadings can be determined for specific applications and are determinable by a person having ordinary skill in the art.

In operation using the first embodiment, the engine 10 can be operated to generate reformates comprising NOx, CO and hydrogen in the exhaust gas feedstream. In one embodiment, this includes operating the engine 10 at an air/fuel ratio between 14.2:1 and 19:1 and advancing timing of the spark ignition to generate the reformates. In one embodiment, this includes operating the engine 10 at or near stoichiometry and injecting additional fuel using a late-combustion fuel injection or a post-combustion fuel injection strategy to generate the reformates. In one embodiment, this includes operating the engine 10 at an air/fuel ratio of 14.6:1 to 30:1 and injecting additional fuel using a late-combustion fuel injection or a post-combustion fuel injection strategy to generate the reformates. Reformates can be generated by injecting an amount of fuel into the combustion chamber at the end of a combustion phase of each combustion cycle, or alternatively during an exhaust phase of each combustion cycle. Such operation to form reformates preferably occurs under specific operating conditions, such as during an acceleration or high-load operating condition and during certain steady-state cruise driving conditions.

The reformates react in the first aftertreatment device 50 to form an NH3 reductant from NOx and hydrogen. The process of controlling operation of the engine 10 to form the NH3 reductant in the exhaust gas feedstream is referred to as passive NH3 SCR operation. The NH3 reductant is storable on the third aftertreatment device 70. Excess NH3 reductant that passes through the third aftertreatment device 70, referred to as ammonia slip, can be oxidized in the fourth aftertreatment device 80. During subsequent engine operation, e.g., under low load and steady state conditions, the engine 10 is operated at a lean air/fuel ratio, preferably in a range that is greater than 20:1. The exhaust gas feedstream contains NOx which passes through the first and second aftertreatment devices 50 and 60 and is reduced to N2 in the third aftertreatment device 70 in the presence of the stored NH3 reductant. The engine 10 can operate under such conditions until the NH3 reductant is substantially depleted or another opportunity to create NH3 reductant is presented, such as during a high load operation or during an acceleration event and during certain cruise driving conditions. When the stored NH3 reductant is substantially depleted, the engine 10 can be controlled to operate at or near stoichiometry in order to minimize NOx generation and permit the second aftertreatment device 60 to operate and use the three-way catalytic function and oxygen storage/release function to oxidize HC and CO and reduce NOx in the presence of stored oxygen. For purposes of this description, the NH3 reductant is substantially depleted when there is insufficient NH3 reductant stored in the third aftertreatment device 70 to reduce NOx in the exhaust gas feedstream to meet a predetermined NOx concentration, measured by way of example in mass of NOx over distance traveled, e.g., mg(NOx)/km.

In one embodiment, the exhaust aftertreatment system 45 includes a reductant injection device 55 having an injection mechanism and a nozzle (not shown) that are fluidly connected to a refillable reservoir 57 that preferably contains urea or another suitable reductant that includes NH3. The nozzle of the reductant injection device 55 is inserted into the exhaust system 45 upstream of the third aftertreatment device 70. The reductant injection device 55 is controlled by the control module 5 to inject a mass flowrate of urea into the exhaust gas feedstream corresponding to the mass of NOx emissions therein, preferably at or slightly rich of a NOx/NH3 stoichiometry point. The process of operating the reductant injection device 55 to inject urea into the exhaust gas feedstream is referred to as active urea dosing. The NOx emissions are reduced to nitrogen in the third aftertreatment device 70 in the presence of NH3 in urea. The active urea dosing can be used during high load engine operation and at low load engine operation when the ammonia stored on the third aftertreatment device 70 is substantially depleted, and at other periods during engine operation.

In one embodiment, the active urea dosing is used in combination with the passive NH3 SCR operation to reduce NOx emissions. During engine operation, e.g., under low load and steady state conditions, the engine 10 is operated at a lean air/fuel ratio, preferably in a range that is greater than 20:1. The exhaust gas feedstream contains NOx which passes through the first and second aftertreatment devices 50 and 60 and is reduced to N2 in the third aftertreatment device 70 in the presence of the stored NH3. Under specific operating conditions when the passive NH3 operation is not practically achievable, e.g., high engine load operation or acceleration, active urea dosing can be used in combination with passive NH3 SCR operation to reduce NOx emissions. The engine 10 can operate under such conditions until the NH3 is substantially depleted or another opportunity to create NH3 passively is presented, such as during a high load operation or during an acceleration event.

The control system preferentially controls engine operation using the passive NH3 SCR operation under specific operating conditions, including when a sufficient or predetermined amount of NH3 has been stored on the third aftertreatment device 70. The active urea dosing can be deactivated when the engine 10 is operating at low and medium load operating conditions including steady state operation with sufficient amount of stored NH3. When the stored NH3 on the third aftertreatment device 70 is substantially depleted, the active urea dosing activated and engine operation and urea injection is controlled in accordance with the active urea dosing to achieve a stoichiometric urea/NOx ratio in the third aftertreatment device 70. In the event of a detected fault in the reductant injection device 55, including the ammonia reservoir tank 57 being empty, the engine 10 can be controlled to operate at or near stoichiometry in order to minimize NOx generation. The second aftertreatment device 60 operates using the three-way catalytic function and oxygen storage/release to oxidize HC and CO and reduce NOx in the presence of stored oxygen.

Figure 3:
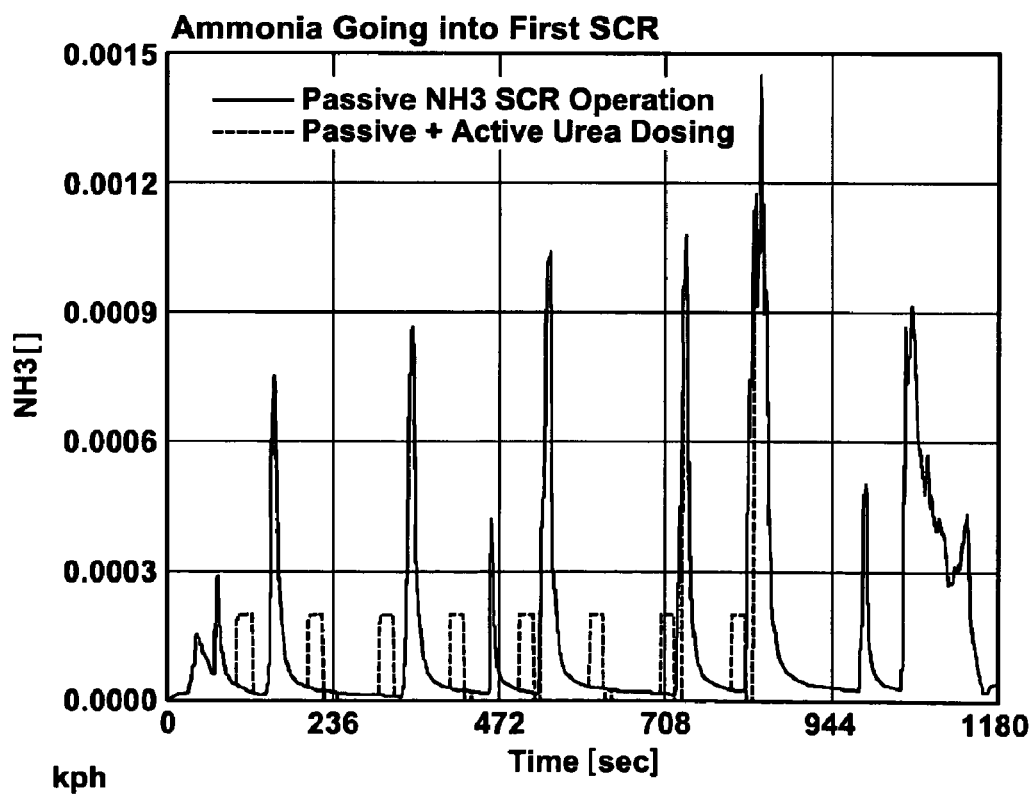
FIGS. 3 and 4 are data graphs, in accordance with the present disclosure.

FIG. 3 graphically shows operation of an exemplary engine constructed and operated in accordance with the disclosure, comprising operating the engine 10 over a series of acceleration and deceleration cycles. The series of acceleration and deceleration cycles are based upon the New European Driving Cycle (NEDC). The graph shows a mass of NH3 that is generated and input to the third aftertreatment device 70 as a result of operating the engine in the passive NH3 SCR operation. The graph further shows a mass of NH3 in the form of urea injected during active urea dosing, preferably using the reductant injection device 55.

Figure 4:
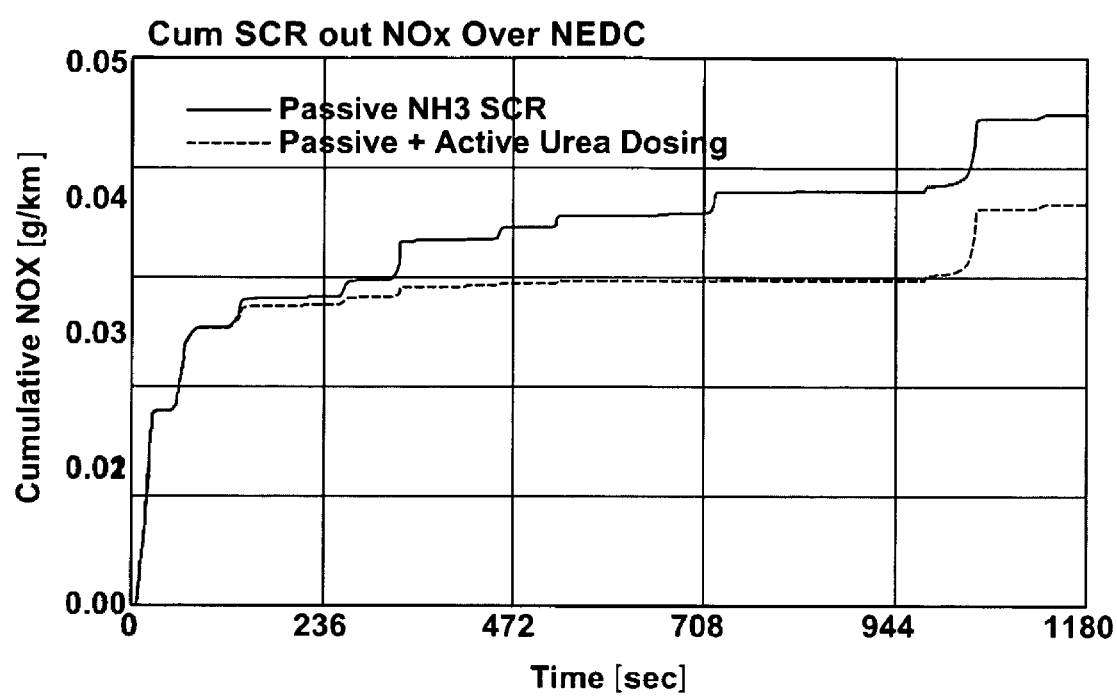

FIG. 4 graphically shows operating the exemplary engine corresponding to FIG. 3. The graph shows a first line depicting cumulative NOx emissions (g/km) output from the exhaust aftertreatment system 45 as a result of operating the engine in the passive NH3 SCR operation. The graph shows a second line depicting cumulative NOx emissions (g/km) output from the exhaust aftertreatment system 45 as a result of operating the engine in the passive NH3 SCR operation in combination with employing active urea dosing, preferably using the reductant injection device 55. The results of FIG. 4 indicate that operating the exemplary powertrain system using the passive NH3 SCR operation resulted in a level of NOx emissions of about 0.045 g/km, and operating the powertrain system using the passive NH3 SCR operation in combination with the active urea dosing resulted in a level of NOx emissions of about 0.037 g/km, which comprises a reduction of NOx emissions of 0.008 g/km or about 18%. The greatest benefit from engine operation using a combination of passive NH3 SCR operation and active urea dosing occurs during steady state operation after the engine has warmed up.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling exhaust emissions from a spark-ignition, direct-injection internal combustion engine, comprising:

connecting an aftertreatment system to an exhaust outlet of the engine to entrain an exhaust gas feedstream, the aftertreatment system comprising a first aftertreatment device fluidly connected upstream of a second aftertreatment device fluidly connected upstream of a third aftertreatment device and a reductant injection system configured to inject urea upstream of the third aftertreatment device, wherein the first aftertreatment device comprises an oxidation catalytic device, the second aftertreatment device comprises a three-way catalytic device including cerium, and the third aftertreatment device comprises an ammonia-selective catalyst reduction device having a capacity to store ammonia reductant;

operating the engine to generate reformates reformable into ammonia reductant storable on the third aftertreatment device; and then operating the engine lean of stoichiometry and reducing nitrides of oxygen in the exhaust gas feedstream using ammonia reductant stored on the third aftertreatment device under low engine load conditions;

operating the engine lean of stoichiometry and employing the reductant injection system to inject urea into the exhaust gas feedstream under low engine load conditions when the ammonia reductant stored on the third aftertreatment device is depleted;

operating the engine and employing the reductant injection system to inject urea into the exhaust gas feedstream and using the ammonia reductant stored on the third aftertreatment device to reduce nitrides of oxygen in the exhaust gas feedstream across the third aftertreatment device under high engine load conditions; and operating the engine at stoichiometry and employing the second aftertreatment device to reduce nitrides of oxygen in the exhaust gas feedstream upon detecting a fault in the reductant injection system.

2. The method of claim 1, wherein operating the engine to generate reformates reformable into ammonia reductant comprises operating the engine at a lean air/fuel ratio and injecting fuel late in each combustion cycle to generate reformates reformable into ammonia.

3. The method of claim 1, further comprising equipping the aftertreatment system with a catalytic device downstream of the third aftertreatment device for controlling ammonia slip.

4. The method of claim 1, wherein operating the engine to generate reformates reformable into ammonia reductant comprises operating the engine at a stoichiometric air/fuel ratio and controlling ignition timing during each combustion cycle to generate reformates reformable into ammonia.

5. The method of claim 1, wherein operating the engine to generate reformates reformable into ammonia reductant comprises operating the engine at a high engine load operation to generate reformates reformable into ammonia.

6. Method for controlling exhaust emissions from a spark-ignition, direct-injection internal combustion engine, comprising:

connecting an aftertreatment system to an exhaust outlet of the engine to entrain an exhaust gas feedstream, the aftertreatment system consisting of an oxidation catalyst fluidly connected upstream of a three-way catalytic device including cerium fluidly connected upstream of an ammonia-selective catalyst reduction device;

controlling spark ignition timing and fuel injection of the internal combustion engine to generate reformates, reforming the reformates to ammonia in the hydrocarbon and storing the ammonia on the selective catalyst reduction device; and then operating the engine lean of stoichiometry and reducing nitrides of oxygen in the exhaust gas feedstream using the ammonia stored on the ammonia-selective catalyst reduction device under low engine load conditions:

operating the engine lean of stoichiometry and injecting urea into the exhaust gas feedstream under low engine load conditions when the ammonia reductant stored on the ammonia-selective catalyst reduction device is depleted;

operating the engine and injecting urea into the exhaust gas feedstream and using the ammonia reductant stored on the ammonia-selective catalyst reduction device to reduce nitrides of oxygen in the exhaust gas feedstream across the ammonia-selective catalyst reduction device under high engine load conditions; and operating the engine at stoichiometry and employing the second aftertreatment device to reduce nitrides of oxygen in the exhaust gas feedstream upon detecting a fault in the reductant injection system.

7. The method of claim 6, further comprising controlling spark ignition timing and fuel injection of the internal combustion engine to generate reformates during the high engine load operation.

8. The method of claim 6, wherein controlling the spark ignition timing and fuel injection of the internal combustion engine to generate reformates comprises operating the engine at an air/fuel ratio between 14.2:1 and 19:1 and advancing timing of the spark ignition to generate the reformates.

9. The method of claim 6, wherein controlling spark ignition timing and fuel injection of the internal combustion engine to generate reformates comprises operating the engine at a stoichiometric air/fuel ratio and injecting additional fuel using a post-combustion injection strategy to generate the reformates.

* * * * *